FIG. 1.

Oct. 23, 1962  E. L. CLIFFORD ET AL  3,059,718
METHOD FOR DISTINGUISHING MULTIPLE REFLECTIONS
IN SEISMIC OBSERVATIONS
Filed June 12, 1958  7 Sheets-Sheet 2

INVENTORS.
EDWARD L. CLIFFORD,
VERNON L. REDDING,
BY John B. Davidson
ATTORNEY.

INVENTORS,
EDWARD L. CLIFFORD,
VERNON L. REDDING,
BY John B Davidson
ATTORNEY.

United States Patent Office 3,059,718
Patented Oct. 23, 1962

3,059,718
METHOD FOR DISTINGUISHING MULTIPLE REFLECTIONS IN SEISMIC OBSERVATIONS
Edward L. Clifford, Houston, and Vernon L. Redding, Bellaire, Tex., assignors, by mesne assignments, to Jersey Production Research Company, Tulsa, Okla., a corporation of Delaware
Filed June 12, 1958, Ser. No. 741,528
2 Claims. (Cl. 181—.5)

This invention relates to geophysical prospecting using seismic techniques, and more particularly to a seismic prospecting technique for determining the existence of certain multiple reflections on seismograms and for determining the depths of the interfaces associated with those multiples.

The general method of geophysical exploration utilizing seismic waves in the earth is well known. Briefly stated, this method comprises the steps of initiating a seismic impulse at or near the surface of the earth, and recording signals generated by geophones as a result of the earth movement at one or more points more or less spaced from the point of origin of the impulse. The recordation must permit measurement of the time elapsing between the instant of the origination of the impulse and the generation of signals as a result of the subsequent earth movement. The original impulse will set up elastic waves that are transmitted through the earth. Any discontinuity or variation of structure within the earth will reflect and/or refract a portion of the energy in the waves so that a recording of the signals from the receiving points will comprise a number of arriving waves, each derived from the original impulse and each differing from the others in time of arrival, magnitude, and wave shape, or all three.

Direct reflections from subterranean strata usually may be readily identified on a seismogram. However, the direct reflections are frequently obscured by events due to seismic disturbances with random time distribution, such as those initiated by general ground unrest and wind noise in the vicinity of the detecting location. Various procedures have been evolved for the purpose of overcoming the effects of disturbances of this nature, such as the procedure described in U.S. Patent No. 2,394,990.

Another type of interfering and confusing seismic wave that appears on seismograms is the result of multiple reflections which are produced by energy being trapped between two or more subterranean interfaces so that the seismic waves reflect back and forth one or more times between the interfaces. Techniques useful in overcoming the effects of random seismic disturbances are of little value in overcoming the deleterious effects of multiple reflections inasmuch as multiple reflections are not randomly distributed in time. Multiple reflections are particularly serious if they should happen to reinforce each other so as to set up standing waves between interfaces. Identification of direct reflections may become exceedingly difficult, if not impossible, as a result of interference by multiple reflections. Furthermore, independently arriving multiple reflections may be taken for direct reflections. Comprehensive discussions of multiple reflections may be found in the articles in the periodical Geophysics, pp. 1–58, vol. XIII, Number 1 (January 1948).

A primary object of the invention is to provide a seismic technique for identifying certain multiple reflections on seismograms obtained by reflection seismology techniques.

Another object is to provide a method for determining the depths of the formation interfaces from which the multiples originate.

Other objects and a more complete understanding of the invention will result from a consideration of the following description thereof when taken in connection with the accompanying drawings, wherein.

According to the teachings of the present invention, a plurality of seismic disturbances are successively initiated in a shothole at different depths, with a time interval between successive disturbances of sufficient duration to permit seismic waves produced by the preceding disturbances to die out for all practical purposes. The vertical distance between adjacent disturbances should not be substantially greater than a quarter wave length of the seismic waves of interest. The seismic waves produced by each disturbance are detected at or near the earth's surface, and the detected signals are recorded in variable-density form. The multiplicity of variable-density seismograms are placed in side-by-side relationship in the order of the depths at which were initiated the seismic disturbances corresponding thereto, with the shot-breaks in line. Certain multiple reflections will be readily distinguishable on the composite record so obtained.

Figure 1:
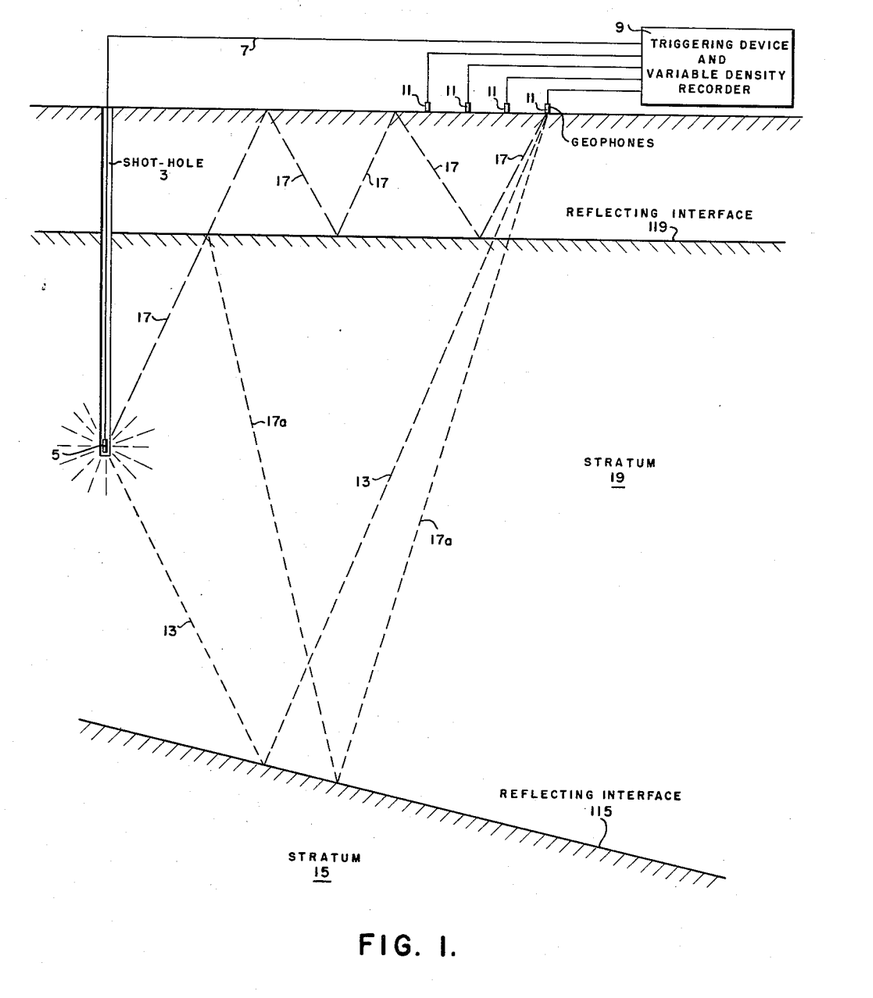
FIG. 1 is a schematic representation in very elementary form, of a seismic observation utilizing apparatus in accordance with the teachings of the present invention.

With reference now to FIG. 1, there is shown typical apparatus for performing a seismic observation. A charge of dynamite 5 or other explosive material placed within a shothole 3 is connected to a triggering mechanism included with a variable-density recorder 9. The triggering mechanism may be a switch and a source of electrical energy actuated by the recording mechanism in the conventional manner. A preferred variable-density recording device is described in co-pending U.S. patent application Serial No. 513,854, filed by C. H. Carlisle et al. on June 7, 1955, for "Automatic Plotter," now U.S. Patent No. 2,967,291. Connected to variable-density recorder 9 are a plurality of geophones 11, the electrical output signals of which are recorded by the variable-density recorder. The device described in patent application Serial No. 513,854 records electrical signals of geophones in variable-density form on electrosensitive paper, the density of each mark being a function of the amplitude of the corresponding electrical signal being recorded.

The geophones 11 may be laid directly on the earth's surface, or they may be placed in small holes drilled in the earth's surface and coupled to the earth by a liquid medium. The triggering device included with the variable-density recorder 9 may be coupled to the explosive charge 5 by a pair of electrical leads 7. The explosive charge 5 is adapted to set up an artificial seismic disturbance when detonated. The artificial seismic disturbance is substantially spherical and progresses outwardly in all directions from the explosive charge. When the seismic wave produced by detonation of the explosive charge 5 reaches a subterranean interface, part of the energy in the wave will pass downwardly through the interface further into the earth, but a portion of it will be reflected upward toward the earth's surface. A ray path that may be followed by a reflected seismic wave from source 5 to a geophone 11 is designated by reference numeral 13. When the seismic wave strikes the interface 115 at the upper surface of stratum 15, a portion of its energy is reflected and progresses upwardly through the earth until it is detected by geophones 11.

While some of the energy coupled to the earth by explosive charge 5 will follow ray path 13 and will travel directly to geophones 11 after being reflected at interface 115, other energy will follow a more devious path to geophones 11. For example, some of the energy may follow ray path 17 and will be reflected downwardly upon reaching the surface 1 of the earth, and may reverberate one or more times between interface 119 at the upper surface of stratum 19 and the earth's surface, each time being detected by geophones 11. Other energy may follow ray path 17A after being reflected at interface 119. At least a portion of this energy may be reflected by the interface 115 and thereafter will be detected by geophones 11.

It is readily apparent, therefore, that several readily correlatable events may appear on a seismogram as a result of such multiple reflections, such as those designated by reference numerals 17 and 17A. A seismic computer may deduce from these correlatable traces that subterranean strata exist which, in fact, may not exist at all, or he may not realize the existence of certain strata because the direct reflections corresponding thereto may be masked by multiple reflections of some type.

In accordance with the teachings of the present invention as stated above, a plurality of explosive charges are initiated in shothole 3. Manifestly, the explosive charges should be detonated in succession starting at the lowermost level of the shothole and progressing upwardly. As stated above, the time interval between successive detonations should be sufficiently long for previously initiated seismic waves to die out. This time interval should be at least 15 seconds. The distance between the depths at which adjacent charges are detonated should be not appreciably greater than a quarter wave length of the seismic waves of interest. For instance, assuming that the seismic frequency of interest is 50 cycles per second, and that the velocity of elastic waves is 6000 feet per second, the spacing between the depths at which adjacent charges are detonated should be not substantially greater than 30 feet.

Figure 2:
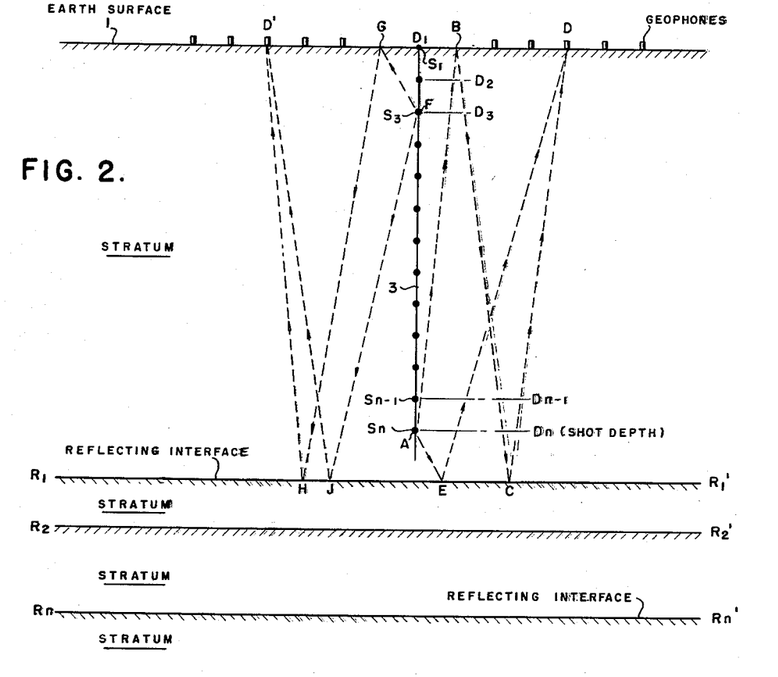
FIG. 2 is a schematic representation of ray paths that may be followed by elastic waves set up in the earth in accordance with the teachings of the present invention.

Referring now to FIG. 2, assume that it has been decided to detonate a plurality of explosive charges in the shothole 3 at a plurality of uniformly spaced depths $D_n$, $D_{n-1}$ ... $D_2$, $D_1$ (earth's surface). Assume further that geophone spreads are located on either side of the shothole. Each explosive charge will set up elastic waves, the downward travelling energy of which will encounter a plurality of reflecting horizons $R_1$, $R_2$ ... $R_n$. A portion of the downward travelling energy from explosive charge $S_n$ will be reflected from horizon $R_1R_1'$ and thereafter will be detected by the geophone spread.

The wave is recorded through each geophone in the spread, and a multi-trace seismogram like those shown in FIGS. 3, 5, 6, 7, 8, and 9 is made from each shot. To simplify the travel time relationships between different reflections (direct and multiple), the ray paths of only one reflection and re-reflection to a given pickup is shown ing FIG. 2. Likewise, ray paths in FIG. 4 are to a single pickup for a reflection and trapped multiple.

The downgoing energy from $S_n$ follows the path AED to a geophone at D. Upward travelling energy from explosive charge $S_n$ may follow the ray path ABCD, inasmuch as a substantial portion of the energy will be reflected from the earth's surface 1 and will travel downwardly to be re-reflected at reflecting horizon $R_1$.

The energy travelling downward from one of the other explosive charges, arbitrarily chosen as charge $S_3$, may follow the ray with FJD' before being detected by the geophone D'. (In FIG. 2, the ray paths corresponding to shots $S_n$ and $S_3$ are shown on opposite sides of the shothole for clarity of presentation. Geophone D' is the counterpart of geophone D.) Energy travelling in an upward direction from explosive charge $S_3$ will be reflected by the earth's surface 1 at point G, will be re-reflected at point H by reflecting horizon $R_1$, and then will be detected at the surface by the geophone D'.

Figure 3:
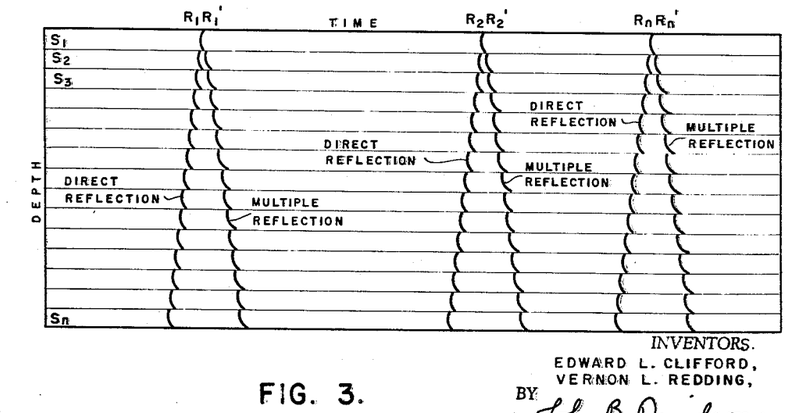
FIG. 3 is an idealized representation of a composite seismogram that may result from elastic waves such as those illustrated in FIG. 2.
Figure 4:
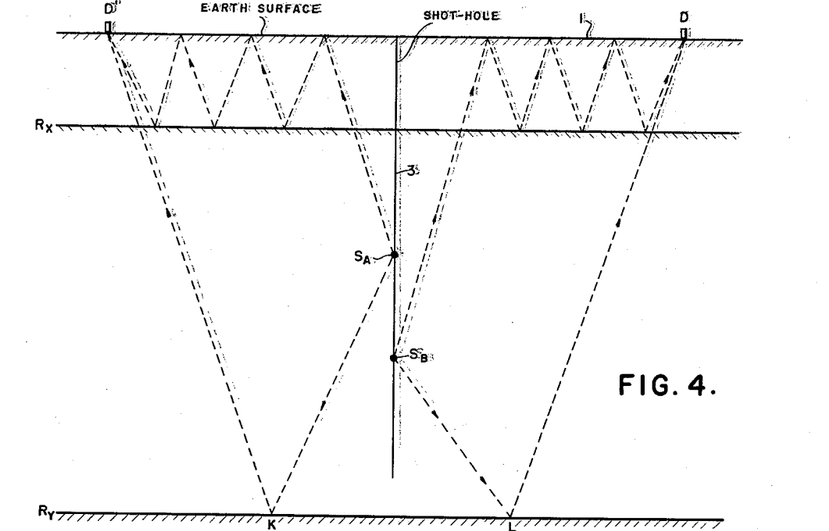
FIG. 4 is another ray path diagram illustrating a direct reflection from a relatively deep interface, and multiple reflections between the surface and a shallower subterranean interface.

If direct reflections and corresponding re-reflections occur from deeper interfaces such as $R_2R_2'$, these events will appear in idealized form as shown in FIG. 3. (On FIG. 3, random noncoherent noise events are not shown for sake of clarity of presentation.) The figure shows a composite seismogram, which consists of individual seismograms corresponding to each of the explosive charges $S_1$, $S_2$, $S_3$ ... $S_n$. The composite seismogram shows, corresponding to each reflecting interface, a direct reflection and the corresponding re-reflection.

Manifestly, with reference again to FIG. 2, the time required for seismic energy to travel from a given shot point to a reflecting horizon and thence directly to a geophone will increase as the depth of the shotpoint is decreased. Conversely, a multiple reflection that initially travels to the earth's surface, thence to a subterranean reflecting horizon, and thereafter to a geophone will be evidenced by a decreasing time interval on the seismogram as the depth of the shot point is decreased. Therefore, in FIG. 3 the slope of the direct reflection in each case is opposite to the slope of the re-reflection. As a consequence, the line of a direct reflection and the line of the corresponding re-reflection will meet at the earth's surface, since it is here that the travel times become equal. Hence, the re-reflections can be recognized as such and the depth of the interface involved in the re-reflection can be found. In this example, this interface is the earth's surface, but in many practical cases it may be some shallow strong interface.

It is possible that the energy (a) initially travelling downward from the shot and (b) initially travelling upward and reflected downward at the surface, may be trapped between interfaces, one or more of which may be below the lowest shot point. Such trapped energy also could result in a plurality of V-shaped events as shown in FIG. 3. In such a case, the events having the slope of direct reflections would not in fact be direct reflections, and all that would be certain about those events is that they correspond to energy initially travelling downward from the shot. Even so, the oppositely sloped events could be identified with certainty as multiple events, since their slope indicates that they correspond to energy initially travelling upward.

Figure 5:
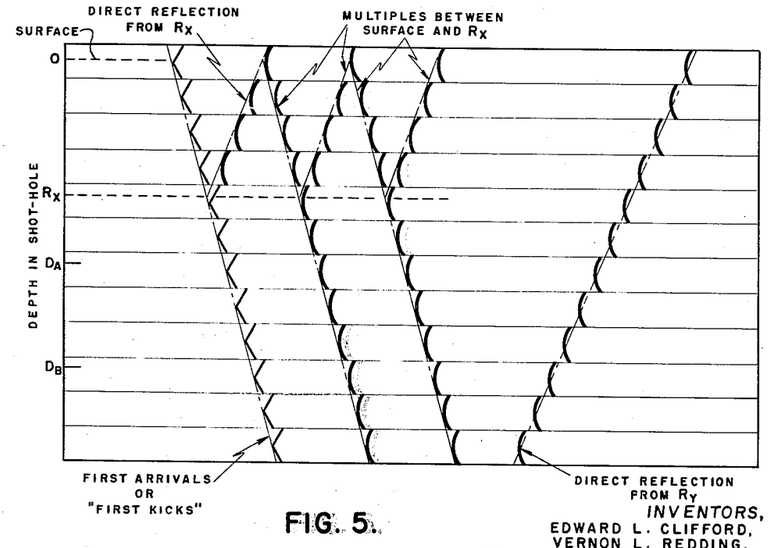
FIG. 5 is an elementary, idealized variable-density composite seismogram useful in understanding the problem illustrated in FIG. 4.

FIGS. 4 and 5 illustrate the effects of reflecting horizons (in addition to the earth's surface) above the depths at which some of the explosive charges are detonated. For the sake of clarity, there are shown only two explosive charges $S_A$ (at depth $D_A$) and $S_B$ (at depth $D_B$), only one reflecting horizon $R_x$ above these charges, and only one reflecting horizon $R_y$ below these charges. The upper charge $S_A$ will produce elastic waves travelling in all directions from the shot point. The downward travelling energy will follow the path designated $S_AKD'$ to the geophone D'. Upward travelling energy will be reflected from the earth's surface and may then reflect back and forth between the earth's surface and reflecting horizon $R_x$ one or more times, each time being detected by the geophones.

It will be noted that as the depth of the shot point increases, the length of the ray path of simple reflections from reflecting horizon $R_y$ will decrease. Conversely, as the depth of the shot point increases, the ray path followed by multiple reflections between the earth's surface 1 and reflecting horizon $R_x$ will increase in length. This situation is illustrated in the idealized composite seismogram of FIG. 5. On such a section, the multiple re-reflections that reverberate between reflecting horizons above the shot point may be readily seen and identified. Identification is possible because for one thing, the multiple events and the direct reflections have opposite slopes, as was the case with the re-reflections and the direct reflections illustrated in FIGS. 2 and 3.

The multiples of FIG. 5 and the re-reflections of FIG. 3 may be readily distinguished from each other, even though both types have a slope reverse to that of direct reflections. The distinction is that in the case of the re-reflection, there is always a corresponding event having the slope of a reflection with these two events intersecting on the resultant section at a depth corresponding to the depth of the upper interface involved, whereas, in the case of multiples reverberating between two layers (as in FIG. 4), there is no reflection record across all of the records in the seismogram such as would be present if the reflection were not a multiple.

Recall that it was previously shown how the depth of the upper interface involved in re-reflections could be found from such a section, as shown in FIG. 3. Consider now FIGS. 4 and 5 with respect to finding the depth of the multiply-reflecting interface $R_x$. FIG. 5 shows records corresponding to shots in regular intervals essentially all the way to the surface. On records corresponding to shots above the trouble interface ($R_x$ in FIG. 4), there appears, corresponding to each multiple event, an event having the slope of a reflection. Each multiple event and its corresponding reflection intersect on a line corresponding to depth $R_x$. Hence, depth $R_x$ can be found.

Therefore, this method of shooting and recording makes it possible not only to identify various kinds of multiple events, but also to determine the depths of the beds associated with these events.

Figure 6:
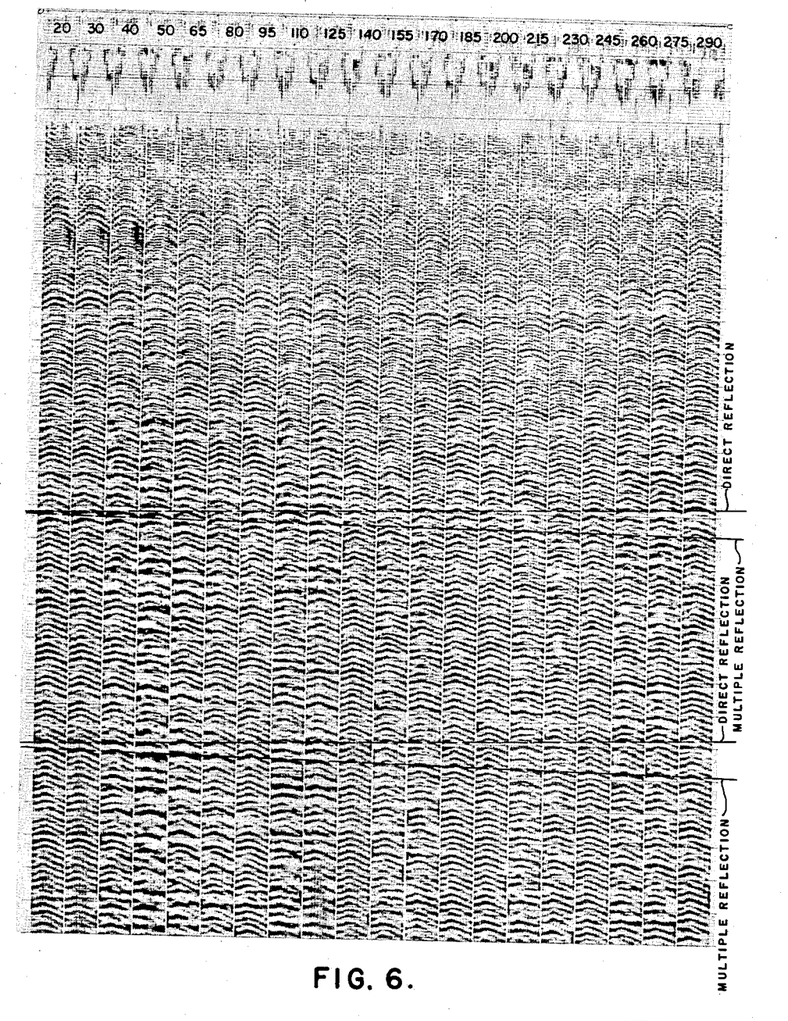
FIGS. 6, 7, and 8 are actual variable-density composite seismograms made in accordance with the teachings of the present invention. The three figures illustrate the effect of increasing the spacing between seismic disturbances on the quality of information gathered.
Figure 7:
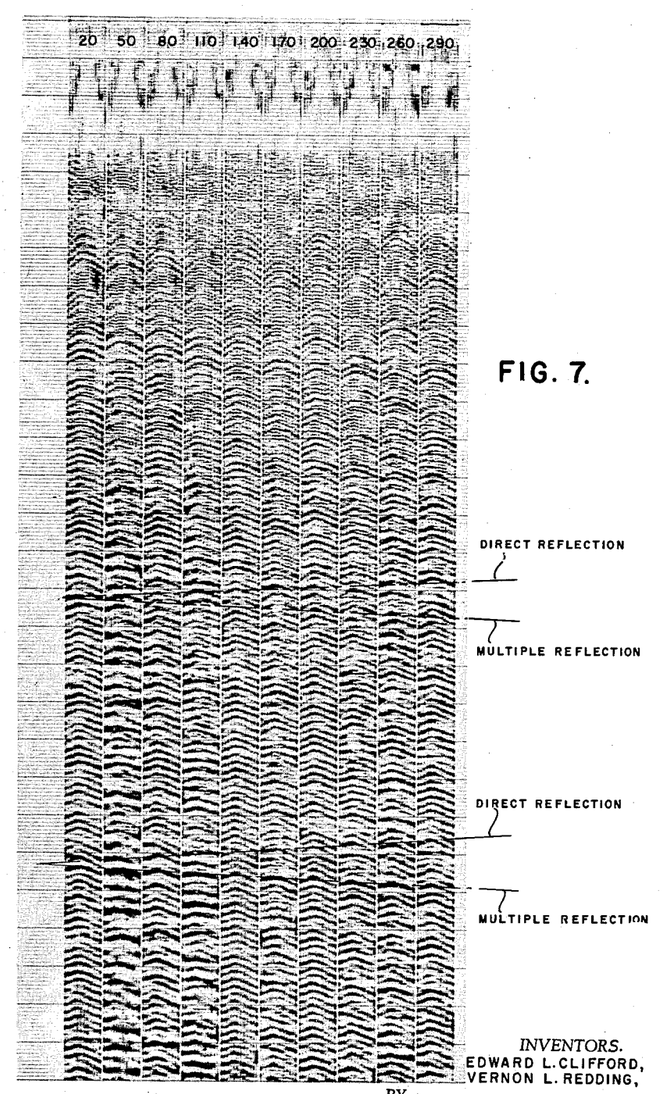
Figure 8:
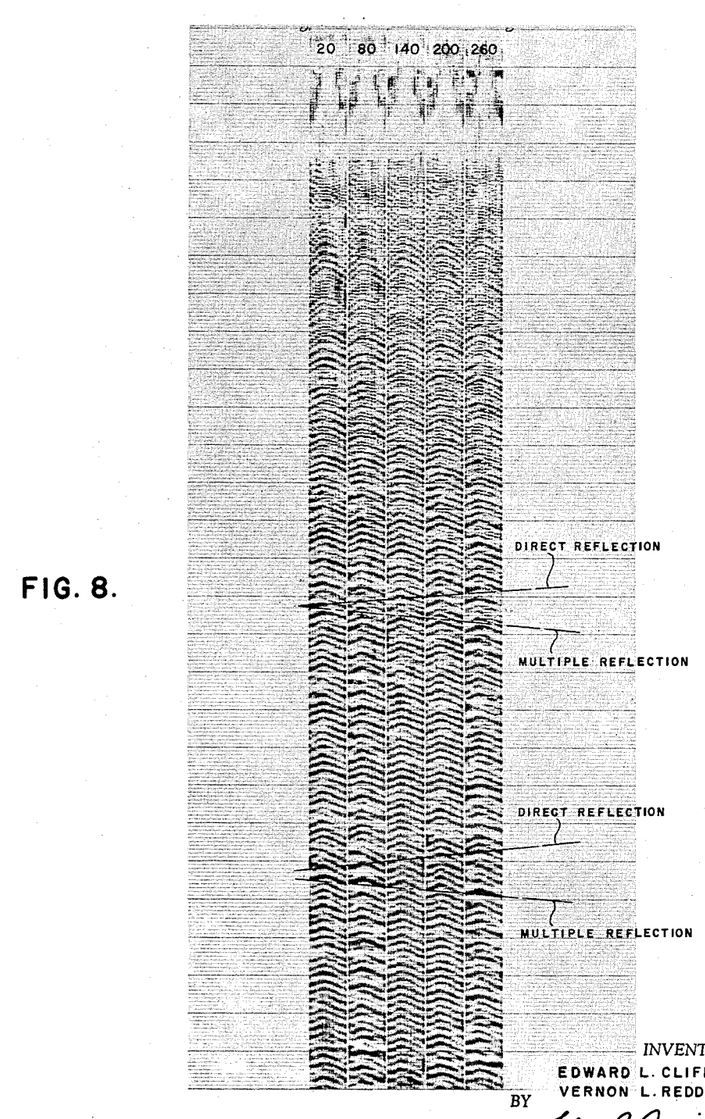

FIGS. 6, 7, and 8 show actual variable-density composite seismograms made in accordance with the teachings of the invention. The various sets of traces of FIG. 6 were made with spacings between adjacent shot points of not more than 15 feet. The depth of the dynamite charge with which each set of traces was made is shown adjacent the set of traces. Each set of traces was obtained from a spread of 12 geophones at detecting points in accordance with accepted seismic prospecting practice. The composite seismogram of FIG. 7 was made from traces utilizing charges spaced 30 feet apart (a quarter wave length for waves with a frequency of 50 c.p.s. at 6000 feet per second velocity) down a shothole, and the composite seismogram of FIG. 8 was made from traces obtained with adjacent charges spaced 60 feet apart. The sets of traces of FIGS. 7 and 8 are the same as the sets of traces of FIG. 6 for corresponding depths of the dynamite charge. The various traces on each composite seismogram were made with the same filter response in the seismic amplifiers.

The reflections and multiple reflections will stand out most perspicuously when the composite seismograms are viewed edge-wise so that the angle of viewing is very small with respect to the plane of the paper.

Following the teachings set forth above, a trained seismic computer will be able to identify many V-shaped events on the composite seismograms of FIGS. 6 and 7. However, identification of these events on FIG. 8 will be difficult, if not impossible, for the best seismic computer. Two of the most prominent V-shaped events on FIGS. 6, 7, and 8 are marked, the same events being marked on each figure. It will be noted that while the events are easily identifiable on FIGS. 6 and 7, they are almost indiscernible on FIG. 8. A trained seismic computer would have great difficulty reading information from FIG. 8 without the benefit of the seismograms of FIGS. 6 and 7.

Figure 9:
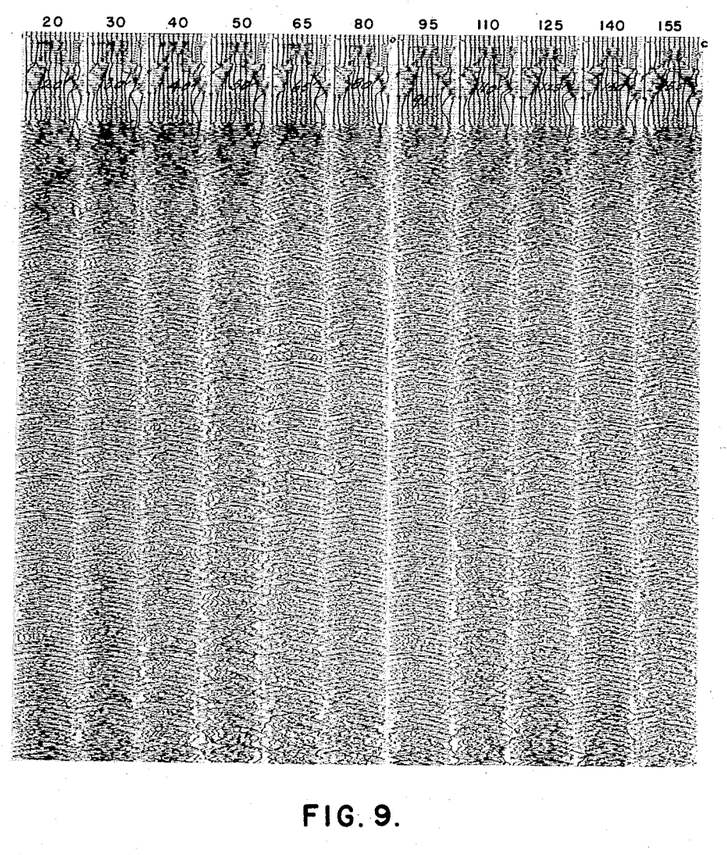
FIG. 9 is a conventional wiggly-trace composite seismogram useful in understanding the significance of the present invention.

It will be found that a spacing between shot points of about one quarter wave length at the seismic frequencies of interest will be the greatest spacing that may be utilized to obtain significant, reliable information. In FIG. 9 there is shown a composite seismogram in conventional wiggly-trace form. This seismogram was made from the same sets of seismic signals from which the seismogram of FIG. 6 was made. The seismogram includes those sets of signals corresponding to shot depths down only to 155 feet because of space limitations on the drawing. A trained seismic computer will be able to glean little or no information from FIG. 9 in comparison to the relatively tremendous amount of information that he can gather from FIG. 6.

The present invention provides a simple, straightforward method for identifying certain multiple reflections in a seismic observation.

It is to be understood that the above is descriptive and illustrative of preferred embodiments of the invention and that various modifications can be made without departure from the spirit of the invention.

What is claimed is:

1. In the art of seismic prospecting wherein a plurality of geophones are arranged on the earth's surface substantially in line with a shothole and in seismic wave detecting relationship with the shothole so as to detect seismic waves emanating from the shothole, and wherein recording means are operatively connected to the geophones for recording the geophone output signals as functions of time from a time reference corresponding to the instant of initiation of a seismic impulse to form seismograms, the method of segregating the seismogram events produced by initially-upgoing seismic waves from other seismogram events, comprising:

in the shothole, separately causing seismic explosions in succession progressing upwardly through the shothole from below the suspected depth of an earth interface responsible for downward reflection of initially-upgoing seismic waves to substantially the earth's surface, with a time interval between successive seismic explosions sufficient to allow seismic waves produced by previous seismic explosions to die out before initiation of each given seismic explosion, successive seismic explosions being vertically spaced apart a distance of substantially a quarter wave length of seismic waves of predetermined frequency;

with said geophones, detecting the seismic waves resulting from each seismic explosion to produce electrical geophone output signals;

forming a record of the geophone output signals produced by each seismic explosion as an individual variable density-type seismogram; and forming a composite seismogram from said individual seismograms by aligning the seismograms produced by the plurality of seismic explosions, in parallel side-by-side relationship with a common time axis, in the order of the depths of the seismic explosions, whereby line-ups of events produced by initially-upgoing seismic waves on the composite seismogram will have a slope opposite to the slope of the lineup of events produced by initially-downgoing seismic waves reflected from subsurface reflecting horizons.

2. In the art of seismic prospecting wherein a plurality of geophones are arranged on the earth's surface substantially in line with a shothole and in seismic wave detecting relationship with the shothole so as to detect seismic waves emanating from the shothole, and wherein recording means are operatively connected to the geophones for recording the geophone output signals as functions of time from a time reference corresponding to the instant of initiation of a seismic impulse to form seismograms, the method of segregating the seismogram events produced by initially-upgoing seismic waves from other seismogram events, and determining the level of a suspected reflecting earth interface for initially-upgoing seismic waves that is penetrated by the shothole, comprising:

in the shothole, separately causing seismic explosions in succession progressing upwardly through the shothole from below the suspected depth of said suspected earth interface responsible for downward reflection of initially-upgoing seismic waves, with a time interval between successive seismic explosions sufficient to allow seismic waves produced by previous seismic explosions to die out before initiation of each given seismic explosion, successive seismic explosions being vertically spaced apart a distance of substantially a quarter wave length of seismic waves of predetermined frequency;

with said geophones, detecting the seismic waves resulting from each seismic explosion to produce electrical geophone output signals;

forming a record of the geophone output signals produced by each seismic explosion as an individual variable density-type seismogram;

forming a composite seismogram from said individual seismograms by aligning the seismograms produced by the plurality of seismic explosions, in parallel side-by-side relationship with a common time axis, in the order of the depths of the seismic explosions, whereby lineups of events produced by initially-upgoing seismic waves on the composite seismogram will have a slope opposite to the slope of the lineup of events produced by initially-downgoing seismic waves reflected from subsurface reflecting horizons; and marking the intersection of oppositely-sloped seismic event lineups on the composite seismogram to determine the depth of said suspected reflecting horizon from the depth of the shot from which was produced the individual seismogram at the intersection.

References Cited in the file of this patent

UNITED STATES PATENTS

| | | |
|---|---|---|
| 2,440,971 | Palmer | May 4, 1948 |
| 2,569,411 | Ellis | Sept. 25, 1951 |
| 2,767,389 | McCollum | Oct. 16, 1956 |
| 2,795,287 | Sharpe | June 11, 1957 |
| 2,806,545 | Schempf | Sept. 17, 1957 |
| 2,808,894 | Eisler et al. | Oct. 8, 1957 |
| 2,882,988 | Dobrin | Apr. 21, 1959 |
| 2,989,135 | Pierce et al. | June 20, 1961 |